Nov. 1, 1966   W. A. KOONTZ   3,281,977
TRANSPARENCY HOLDER
Filed Oct. 22, 1964
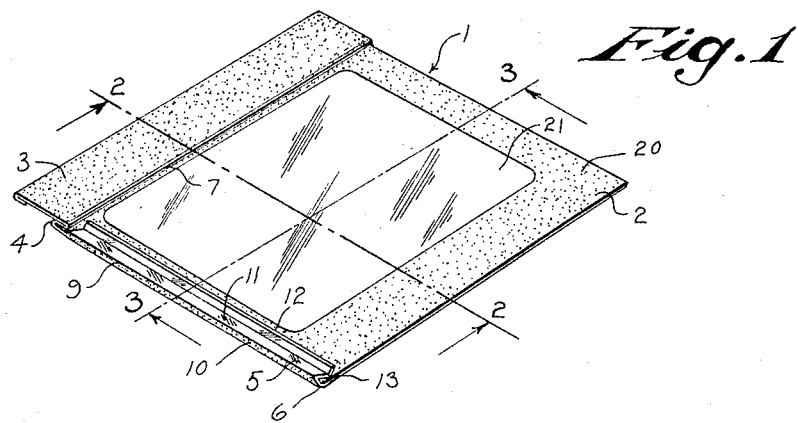
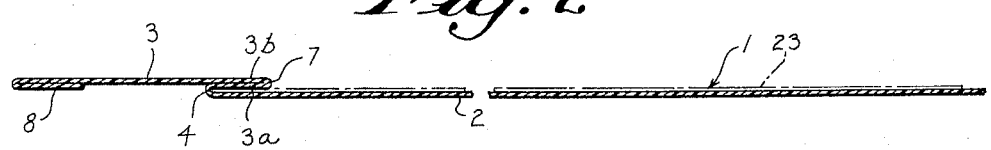
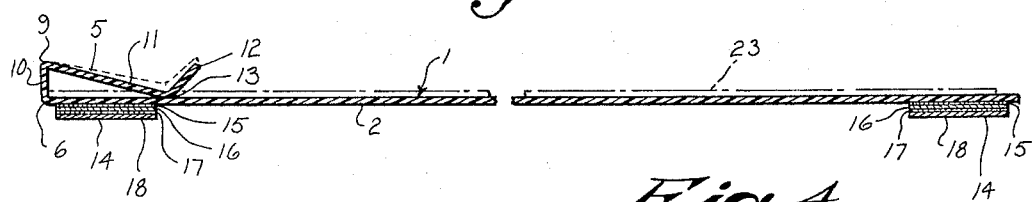
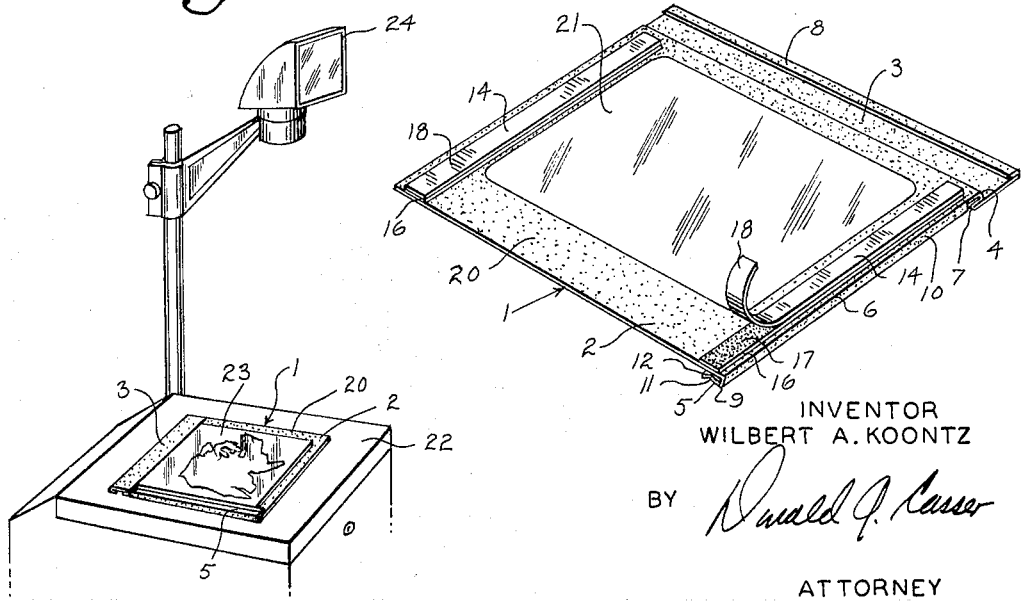
INVENTOR
WILBERT A. KOONTZ
BY Donald J. Casser
ATTORNEY

United States Patent Office 3,281,977
Patented Nov. 1, 1966

3,281,977
TRANSPARENCY HOLDER
Wilbert A. Koontz, Bayside, Wis., assignor to Milprint, Inc., Milwaukee, Wis., a corporation of Delaware
Filed Oct. 22, 1964, Ser. No. 405,755
5 Claims. (Cl. 40—158)

This invention relates generally to the art of handling transparencies; more specifically, it relates to a new holder or frame for holding transparencies on the lighted stage of a projector, which holder includes structural members adapted to engage transparencies and retain them in a suitable position for efficaceous projection.

Transparencies are finding increasing use for visual presentation of information, particularly for educational purposes. They comprise a sheet of transparent material, most often cellulose acetate film, to which the desired information is applied by any suitable means such as printing, drawing, etc. For effective display of such transparencies, particularly to group audiences, it is often desired to project them onto a wall or screen and the so-called overhead projectors, which have an illuminated stage on which the projected transparency is received, find widespread use for this purpose. Transparencies can be displayed individually or two or more can be combined for projection as where one transparency augments another to provide a progressive build-up or sequential development of related information.

A principal object of this invention is to provide an improved device for holding one or more transparencies, particularly a device for holding transparencies on a projector. Another main object is to provide a device which can hold a transparency in a fixed position on a projecting apparatus, such as on the illuminated stage of the overhead projector. Still another object is to provide a holder for transparencies which is constructed to facilitate the registration of each transparency in a group of transparencies in those instances in which it is desired to combine more than one transparency for simultaneous projecting or viewing wherein the information on one transparency is to be in a predetermined relation, vis-a-vis the information on other transparencies in the group. A more specific object is to provide a holder of the foregoing capabilities which has a construction which permits ready fabrication from a single sheet of material.

Briefly stated, the transparency holder of this invention comprises a sheet of transparent material including a base panel on which a transparency is received and panels on at least two sides of the base panel which are folded in such a manner as to adapt them to engage edges of the transparency to retain it in a fixed position on the base panel.

The foregoing and other objects will appear in the description which follows. In the description, a specific form of the transparency holder device of this invention is illustrated to fully explain its construction to those skilled in the art. However, those skilled in the art may modify structural features of the holder described herein or device holders of other constructions and still remain within the true spirit and scope of the present invention. It is intended that such modifications be embraced within the appended claims, unless restricted by the prior art, and the following description is given for purposes of illustration and not limitation.

In the drawings:

FIG. 1 is a perspective view of a transparency holder constructed in accordance with the present invention;

FIG. 2 is an enlarged sectional view, with a portion broken away, taken along the plane of line 2—2 of FIG. 1;

FIG. 3 is an enlarged sectional view, with a portion broken away, taken along the plane of line 3—3 of FIG. 1;

FIG. 4 is a perspective view of the underside of the transparency shown in FIG. 1; and FIG. 5 is a schematic perspective view illustrating the transparency holder of FIGS. 1-4 as used in conjunction with an overhead projector.

In the following description and claims, various terms such as side, top, end, back, etc., are used to denote structure or relative position, but these terms are used for the purposes of illustration and not as limitations. Thus, what is referred to as a top may be a bottom in any specific application of this invention. Also, in the following description, like reference numerals are used to refer to the same elements in the various drawings.

FIG. 1 illustrates one form of a transparency holder constructed in accordance with the present invention. The holder, indicated generally by the reference numeral 1, includes a base panel 2, a first side panel 3 connected to one side, the top herein, of the base panel 2 along a fold line 4, and a second side panel 5 connected to another side of the base panel along a fold line 6. The holder can be formed of any suitable foldable transparent material; cellulose acetate film of 10 to 15 mils thickness has proved an effective material, but other transparent films, particularly synthetic plastic films, can be used.

As best shown in FIG. 2, the panel 3 is folded inwardly towards the center of the base panel along the fold line 4 to provide a portion 3a which overlies part of the base of the holder. The balance of the panel 3, portion 3b, can be folded back over the portion 3a along a second fold line 7, spaced inwardly of the fold line 4, and is shown herein as extending beyond the fold line 4. This construction provides a folded edge along one side of the base panel formed by the bight portion about the fold line 4 connecting the side panel 3 to the base panel 2. At its outermost edge, a lip 8 can be formed by folding over part of the panel so as to lend rigidity to the free edge thereof.

Referring now to the cross-sectional view of FIG. 3, the side panel 5 is folded along fold lines 6 and 9 to provide an upstanding end wall 10 extending at an angle to the base panel, herein illustrated as extending vertically to the base panel, and a second wall 11 which extends from the fold line 9 obliquely towards the base to overlie a side thereof. The wall 11 has its leading edge 12 upturned about a medial fold line 13 so that the leading edge extends at approximately a 45° angle to the base for the purposes hereinafter set forth. Thus, one portion of the wall 11 extends from the upstanding wall 10 towards the base panel and another portion 12 is connected thereto and extends away from the base panel. In general, the wall 11 will be urged to a position wherein the fold line 13 will be in contact with the uppermost surface of the base panel due to the inherent resiliency of the material from which the holder is made.

FIG. 4 shows the underside of the holder 1 to illustrate a suitable means for applying the holder to a projector. For this purpose, an adhesive member 14 is applied to each side of the base of the holder, each member 14 having a construction shown in cross-section in FIG. 3 and comprising a layer of pressure-sensitive adhesive 15 applied to one side of a film 16, a second layer of pressure-sensitive adhesive 17 applied to the other side of the film, and a release coated liner 18 removably joined to the layer 17. The adhesive layer 15 of each member 14 is adhesively bonded to the underside of the holder so that the two members are each tightly secured in place. A liner 18 is lightly bonded to an adhesive layer 17 to protect the adhesive until it is ready to be used, at which time the liner can be peeled off without stripping the adhesive from the film 16. The liner 18 shown on the right in FIG. 4 is depicted as being removed in this fashion. The adhesive members 14 are only one form of adhesive means that can be used to apply the holders of this invention to a suitable projector; in addition, nonadhesive mechanical means can be used to achieve the desired result and, for this reason, it is not desired to limit this invention to the particular adhesive means shown.

Returning now to FIG. 1, an opaque border 20 can be printed over one surface of the base panel 2 of the holder so as to frame a transparent area 21 through which light can be projected. The opaque border can also be extended to cover the visible portions of the first panel 3. It is preferred that the base panels of the holder have such an overall size as to entirely mask out all extraneous light on an overhead projector so that light will only be transmitted through the central transparent area 21 of the holder. This will avoid the formation of distracting light areas since most projectors generally have a stage that is larger than the transparency that is to be projected. Thus the sides of the opaque border 20 should be selected with due regard to the size of the transparencies which will normally be projected. The border can be eliminated if the transparencies to be projected include a border.

When put to use, the transparency holder 1 is applied over the illuminated stage of an overhead projector such as the projector 22 shown in FIG. 5. The holder is held in place by removing the liners 18 from each adhesive member 14 and firmly pressing each side of the holder so that the adhesive layers 17 will become bonded to the top of the projector. A transparency 23 is then inserted in the holder so that its top edge passes underneath the portion 3a of the first panel 3 and its side edge passes underneath the wall 11 of the folded second panel 5. This condition is illustrated in FIG. 2 wherein the transparency 23 is shown in dashed lines. The topmost edge of the transparency 23 abuts the inner surface of the folded edge along the fold line 4 connecting the first panel 3 to the base panel. This restricts further upward movement of the transparency. Turning now to FIG. 3, a side edge of the transparency 23 passes underneath the wall 11 of the second panel 5 and its edge abuts along the upstanding wall 10 of the panel. The upturned inner edge 12 of the wall 11 aids in deflecting or guiding the transparency in passing under the wall 11. When the transparency is inserted, the wall 11 of the panel 5 may be raised slightly to its dotted line position in FIG. 3 so that the transparency 23 is gently gripped along the fold line 13 and, due to the resiliency of the material in which the holder is made, this will serve to aid in retaining the transparency in a fixed position on the holder. When inserted in the holder in this manner, the transparency 23 will be held in a position in proper registry for projection and will be retained in that position due to the structural features of the holder. Additional transparencies can be inserted on top of the transparency 23 in the manner described and the upstanding wall 10 of the panel 5 should be of sufficient height to accommodate the desired number of transparencies; being flat, its shape insures that additional transparencies will have a satisfactory surface to contact in order to obtain proper registry. With the holder 1 in place on the projector, the transparency 23 can be projected through the head 24 onto any suitable wall or screen.

The transparency holder of this invention offers several important advantages in comparison to prior art devices used for holding transparencies. Typical known holders include cutout cardboard frames to which a transparency must be taped, folded cutout cardboard frames of easel-style which also require the use of some type of joinder of the transparency to the frame, and mechanical arrangements having pins fixed to the projector and perforations in the transparencies (or cardboard frames holding the transparencies) to engage the pins. The single or folded cardboard frames do not offer the features of holding a transparency in a fixed position or facilitating registry of all transparencies in the group as exhibited by the present holder. The devices utilizing pins and perforations on the transparencies for hanging thereon can be unsatisfactory in that there is danger of tearing the perforations in the transparencies and not all projectors have this arrangement. Additionally, each of these prior art devices is unsatisfactory when it is desired to project a group of transparencies since they must be taped together in some fashion in order to obtain proper registration of each transparency with respect to the others in the group. This is cumbersome and time-consuming in contrast to the accurate, rapid registration of a build-up of transparencies with the holder of the present invention which can be accomplished without joining the transparencies to the holder. The holder of this invention can be easily applied to any type of overhead projector.

Although shown herein as including one side panel 3 and one side panel 5, a holder of this invention can also be formed with other combinations, such as two panels 3 and one panel 5, two panels 5 and one panel 3, two panels 3 and two panels 5, etc. For most applications, however, there should be at least two such side panels positioned about intersecting sides of the base panel in order to properly hold a transparency in position.

It is to be understood that it is intended to cover all changes and modifications of the examples of this invention herein chosen for the purposes of illustration which do not constitute a departure from the spirit and scope of the present invention.

I claim:
1. A holder for transparencies comprising, in combination:
   a sheet of flexible transparent material including a base panel and at least two side panels arranged on intersecting sides of the base panel;
   at least one of the side panels being folded to define an upstanding first wall extending at an angle to the base panel and a second wall joined to the first wall and overlying part of the base panel, said second wall having one portion extending from the outstanding first wall towards the base panel and another portion connected thereto and extending away from the base panel;
   at least one other side panel being folded to define a folded edge connecting it to the base panel, a first portion overlying part of the base panel, and a second portion folded back over the first portion;
   an opaque border about the periphery of the base panel to frame a transparent portion thereof; and
   the side panels being adapted to receive a transparency under their portions overlying the base panel with one edge of the transparency abutting said upstanding first wall in said one side panel and with a second edge of the transparency abutting the folded edge between said other side panel and the base panel to thereby hold a transparency in position over the transparent area of the base panel.

2. A holder for transparencies comprising, in combination:
   a sheet of flexible transparent material including a base panel and at least two side panels arranged on intersecting sides of the base panel;
   at least one of the side panels being folded to define an upstanding first wall extending at an angle to the base panel and a second wall joined to the first wall and overlying part of the base panel;
   at least one other side panel being folded to define a folded edge connecting it to the base panel with at least part of the side panel overlying part of the base panel; and the side panels being adapted to receive a transparency under their portions overlying the base panel with one edge of the transparency abutting said upstanding first wall in said one side panel and with a second edge of the transparency abutting the folded edge between said other side panel and the base panel.

3. A holder for transparencies comprising, in combination:

a sheet of flexible transparent material including a base panel and at least two side panels arranged on intersecting sides of the base panel;

at least one of the side panels being folded to define an upstanding first wall extending at an angle to the base panel and a second wall joined to the first wall and overlying part of the base panel, said second wall having one portion extending from the upstanding first wall towards the base panel and another portion connected thereto and extending away from the base panel;

at least one other side panel being folded to define a folded edge connecting it to the base panel with at least part of the side panel overlying part of the base panel; and the side panels being adapted to receive a transparency under their portions overlying the base panel with one edge of the transparency abutting said upstanding first wall in said one side panel and with a second edge of the transparency abutting the folded edge between said other side panel and the base panel.

4. A holder for transparencies comprising, in combination:

a sheet of flexible transparent material including a base panel and at least two side panels arranged on intersecting sides of the base panel;

at least one of the side panels being folded to define an upstanding first wall extending at an angle to the base panel and a second wall joined to the first wall and overlying part of the base panel;

at least one other side panel being folded to define a folded edge connecting it to the base panel, a first portion overlying part of the base panel, and a second portion folded back over the first portion; and the side panels being adapted to receive a transparency under their portions overlying the base panel with one edge of the transparency abutting said upstanding first wall in said one side panel and with a second edge of the transparency abutting the folded edge between said other side panel and the base panel.

5. A holder for transparencies comprising, in combination:

a sheet of flexible transparent material including a base panel and at least two side panels arranged on intersecting sides of the base panel;

at least one of the side panels being folded to define an upstanding first wall extending at an angle to the base panel and a second wall joined to the first wall and overlying part of the base panel, said second wall having one portion extending from the upstanding first wall towards the base panel and another portion connected thereto and extending away from the base panel;

at least one other side panel being folded to define a folded edge connecting it to the base panel, a first portion overlying part of the base panel, and a second portion folded back over the first portion; and the side panels being adapted to receive a transparency under their portions overlying the base panel with one edge of the transparency abutting said upstanding first wall in said one side panel and with a second edge of the transparency abutting the folded edge between said other side panel and the base panel.

References Cited by the Examiner

UNITED STATES PATENTS

| | | | |
|---|---|---|---|
| 1,900,651 | 3/1933 | Koenig et al. | 88—24 |
| 1,973,827 | 9/1934 | Shwartz | 88—24 |
| 2,803,164 | 8/1957 | Lehv | 88—24 |
| 2,952,930 | 9/1960 | Hartle | 40—10 |

EUGENE R. CAPOZIO, *Primary Examiner.*

W. J. CONTRERAS, *Assistant Examiner.*